US007293733B2

(12) United States Patent
Hoge

(10) Patent No.: US 7,293,733 B2
(45) Date of Patent: Nov. 13, 2007

(54) INTEGRATED REEL LOCKING DEVICE FOR MEDIA CARTRIDGE AND ASSOCIATED METHODS OF MANUFACTURE

(75) Inventor: David T. Hoge, Westminster, CO (US)

(73) Assignee: Quantum Corporation, San Jose, CA (US)

( * ) Notice: Subject to any disclaimer, the term of this patent is extended or adjusted under 35 U.S.C. 154(b) by 358 days.

(21) Appl. No.: 10/959,644

(22) Filed: Oct. 5, 2004

(65) Prior Publication Data

US 2006/0071108 A1    Apr. 6, 2006

(51) Int. Cl.
*G11B 23/107* (2006.01)

(52) U.S. Cl. .................................. 242/348; 360/132

(58) Field of Classification Search ............. 242/338.1, 242/338.3, 343, 348; 360/132
See application file for complete search history.

(56) References Cited

U.S. PATENT DOCUMENTS

| 3,622,101 A | 11/1971 | Sulliff et al. |
| 3,831,881 A | 8/1974 | Tucker |
| 4,056,244 A | 11/1977 | Matsutsuka |
| 4,232,840 A * | 11/1980 | Sugawara ................ 242/338.3 |
| 4,304,331 A | 12/1981 | Minkow |
| 4,458,857 A | 7/1984 | Moore et al. |
| 4,871,064 A | 10/1989 | Hehn et al. |
| 4,901,856 A | 2/1990 | Thiele |
| 4,934,623 A | 6/1990 | Kitsuki |
| 5,760,995 A | 6/1998 | Heller et al. |
| 5,826,811 A | 10/1998 | Melbye et al. |
| 6,154,342 A | 11/2000 | Vanderheyden et al. |
| 6,234,416 B1 | 5/2001 | Nayak |
| 6,264,126 B1 | 7/2001 | Shima et al. |
| 6,315,230 B1 | 11/2001 | Hansen et al. |
| 6,452,747 B1 | 9/2002 | Johnson et al. |
| 6,572,045 B2 | 6/2003 | Blair et al. |
| 6,618,224 B2 | 9/2003 | Cripps et al. |
| 6,654,204 B2 | 11/2003 | Morita et al. |
| 7,175,123 B2 * | 2/2007 | Hiraguchi ................ 242/343.2 |
| 2002/0071213 A1 | 6/2002 | Schoettle et al. |

* cited by examiner

*Primary Examiner*—John Q. Nguyen
(74) *Attorney, Agent, or Firm*—Morrison & Foerster LLP

(57) ABSTRACT

A data storage cartridge includes a housing having a reel disposed between an upper and a lower portion of the housing, the reel capable of movement within the cartridge housing. The data storage cartridge further includes a locking mechanism, where the locking mechanism selectively restricts movement of the reel within the cartridge housing. The reel may be selectively unlocked and locked to reduce the potential for damage during handling. The locking mechanism may be integrally formed with the cartridge housing, e.g., the locking mechanism is not removed from the cartridge when unlocked. In one example, the locking mechanism may include a cam actuator, where rotation of the cam actuator selectively restricts movement of the reel. The cam may be coaxially aligned with the reel and accessible from an exterior of the cartridge housing.

31 Claims, 7 Drawing Sheets

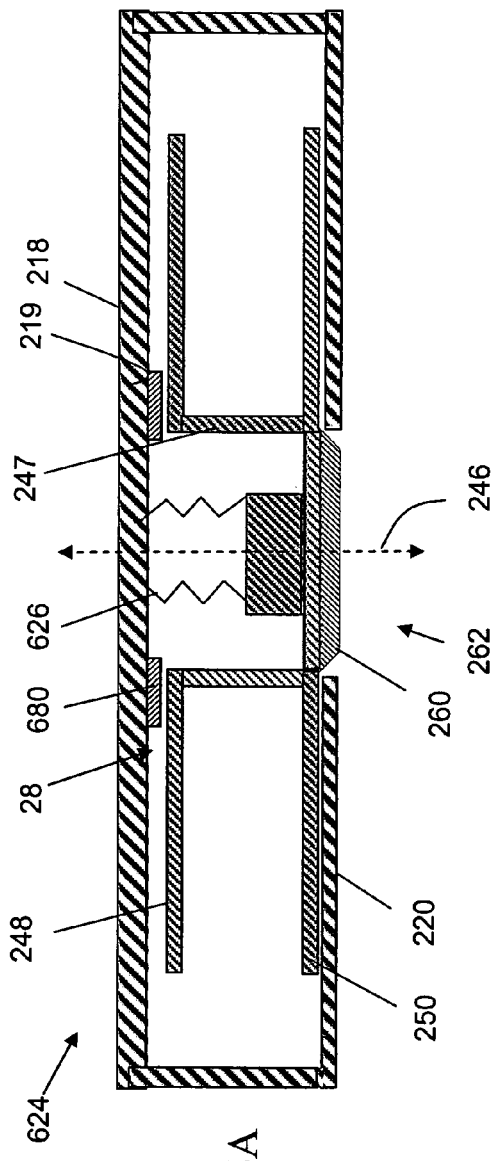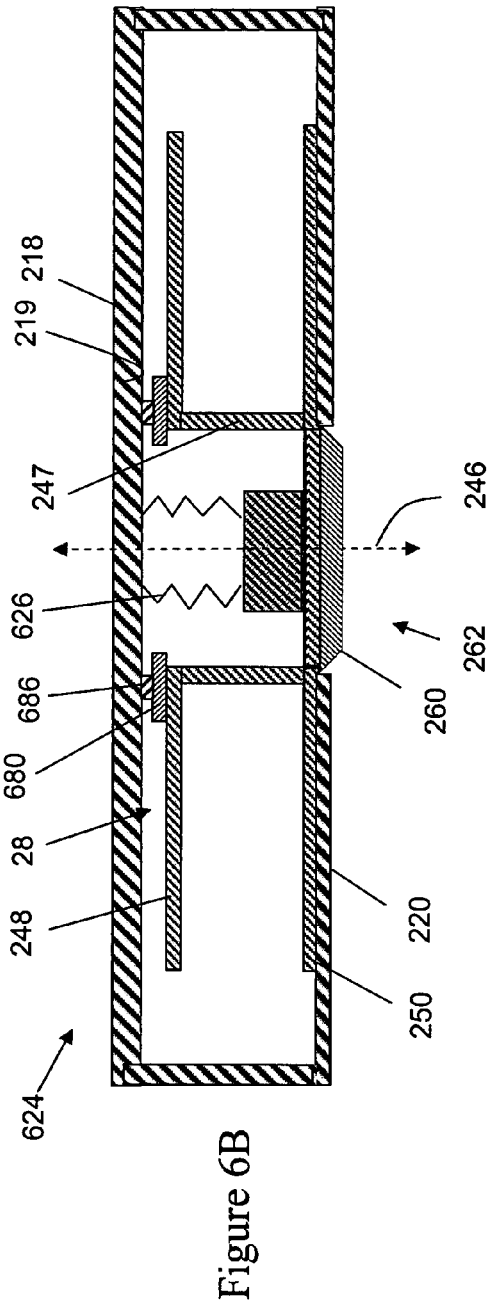
Figure 6A
Figure 6B

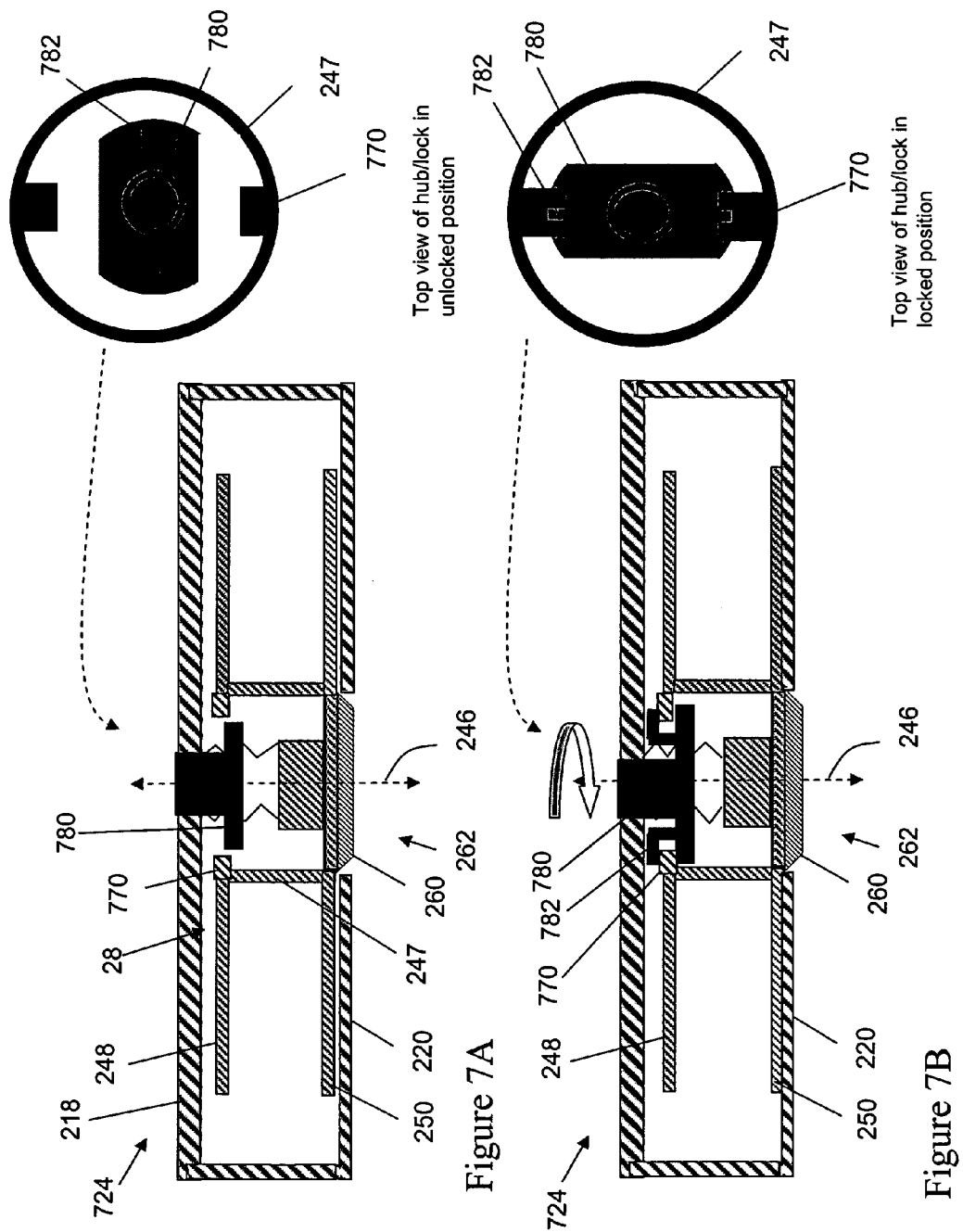

INTEGRATED REEL LOCKING DEVICE FOR MEDIA CARTRIDGE AND ASSOCIATED METHODS OF MANUFACTURE

BACKGROUND OF THE INVENTION

1. Field of the Invention

The invention relates generally to storage media devices, and more specifically to storage media cartridges having one or more reels.

2. Description of the Related Art

Magnetic tape cartridges have been used to conveniently and efficiently store and handle magnetic recording media for tape drives. One type of tape cartridge consists of a substantially rectangular exterior cartridge housing and a single reel containing a magnetic tape positioned within the housing. The cartridge housing includes an upper housing section and a lower housing section which substantially enclose the magnetic tape, which includes a cartridge leader. The cartridge leader becomes exposed through an opening in the cartridge housing during insertion of the cartridge into the tape drive. The tape drive is then able to engage and retrieve the tape from the cartridge for recording and/or playback.

The reel includes a hub, one or more flanges, and a plurality of teeth that are exposed through an access opening in the lower housing section. A drive clutch on the tape drive engages the teeth in order to rotate the reel. Typically, a spring within the cartridge housing biases the reel toward the opening in the lower housing section. During engagement between the drive clutch and the teeth, the tape drive exerts a force against the reel, urging the reel toward the upper housing section, thereby partially compressing the spring to promote a secure engagement between the drive clutch and the reel. The tape drive then rotates the reel and guides the tape across a data transducer that reads data from and/or writes data to the tape.

While movement of the reel between upper housing section and lower housing section is typical during normal operation in a tape drive (for example, to bias the reel to the reel driver and allow for tape drive tolerances), it has been found that such movement presents problems during handling outside the tape drive. In particular, undesired movement of the reel within the housing may damage the reel and/or the magnetic tape which is wound thereon. For example, if the cartridge is dropped or otherwise jostled, axial or tilting movement of the reel within the cartridge housing may result in contact between the one or more flanges and the cartridge housing, which can cause contact between one or more flanges of the reel and the tape. Typically, the flanges are relatively thin and can deflect somewhat easily. Contact between the reel and interior of the housing is especially likely if the cartridge is dropped on its top shell, causing the reel to be displaced towards the top shell.

Moreover, current design preference among tape manufacturers is to develop tape that is thinner to increase storage capacity. As tape becomes thinner, however, the tape is more easily damaged. For example, the potential for tape edge damage is increased if the tape comes in contact with portions of the reel or housing. In addition to damaging the outside edge of the tape, winding phenomena which results in the uneven or staggered wrap (i.e. packslip, popped strand) of the tape onto the reel also renders the tape vulnerable to damage. For example, damage to the magnetic tape may result in incorrect data reading and/or writing, or lost data by the tape drive.

Accordingly, the need exists to provide a cartridge that reduces or inhibits the potential for damage to the tape and/or reel due to movement of the reel within the cartridge housing, particularly when the cartridge experiences sudden movement, e.g., a shock or jolt from being dropped. Further, the need exists to provide a cartridge that reduces or inhibits the potential for damage to the tape and/or reel when being handled between uses in a tape drive, but otherwise operates as a conventional cartridge.

BRIEF SUMMARY OF THE INVENTION

In one example of one aspect of the invention, a data storage cartridge is provided. The data storage cartridge includes a housing having a reel disposed between an upper and lower portion of the housing, the reel capable of movement within the cartridge housing. The data storage cartridge further includes a locking mechanism, wherein the locking mechanism selectively restricts movement of the reel within the cartridge housing. For example, the reel may be selectively unlocked and locked to reduce the potential for damage during handling. The locking mechanism may be integrally formed with the cartridge housing, e.g., the locking mechanism is not removed from the cartridge when unlocked. In one example, the locking mechanism may include a cam actuator, wherein rotation of the cam actuator selectively restricts movement of the reel. The cam may be coaxially aligned with the reel and accessible from an exterior of the cartridge housing.

According to another example, a data storage cartridge includes a housing having a reel rotatably disposed within the housing between an upper and lower portion. The cartridge further includes a cam, where the cam may be selective rotated to press and hold the reel against a portion of the housing, thereby restricting motion of the reel within the housing.

According to another example of another aspect of the invention, a method for manufacturing a storage media cartridge is provided. In one example, the method includes rotatably mounting a reel within a cartridge housing, and disposing a locking mechanism with the cartridge housing, the locking mechanism adapted to selectively restrict movement of the reel within the cartridge housing.

According to another aspect, a media drive is provided. In one example, a media drive engages a locking mechanism of a data storage cartridge, the locking mechanism for selectively restricting movement of a reel within the data storage cartridge housing. The drive may unlock the locking mechanism associated with a storage cartridge prior to unwinding storage media. In one example, the act of inserting the cartridge into the drive unlocks the locking mechanism. Additionally, the drive may lock the locking mechanism associated with the storage cartridge prior to or during ejecting the cartridge from the drive. The drive may include a passive or active mechanism for locking/unlocking the locking mechanism associated with the storage cartridge.

The present invention is better understood upon consideration of the detailed description below in conjunction with the accompanying drawings and claims.

BRIEF DESCRIPTION OF THE DRAWINGS

FIGS. 6A and 6B illustrate cross-sectional side-views of another exemplary media cartridge having an integrated locking mechanism in an unlocked and locked position respectively; and FIGS. 7A and 7B illustrate cross-sectional side-views of another exemplary media cartridge having an integrated locking mechanism in an unlocked and locked position respectively.

DETAILED DESCRIPTION OF THE INVENTION

Figure 1:
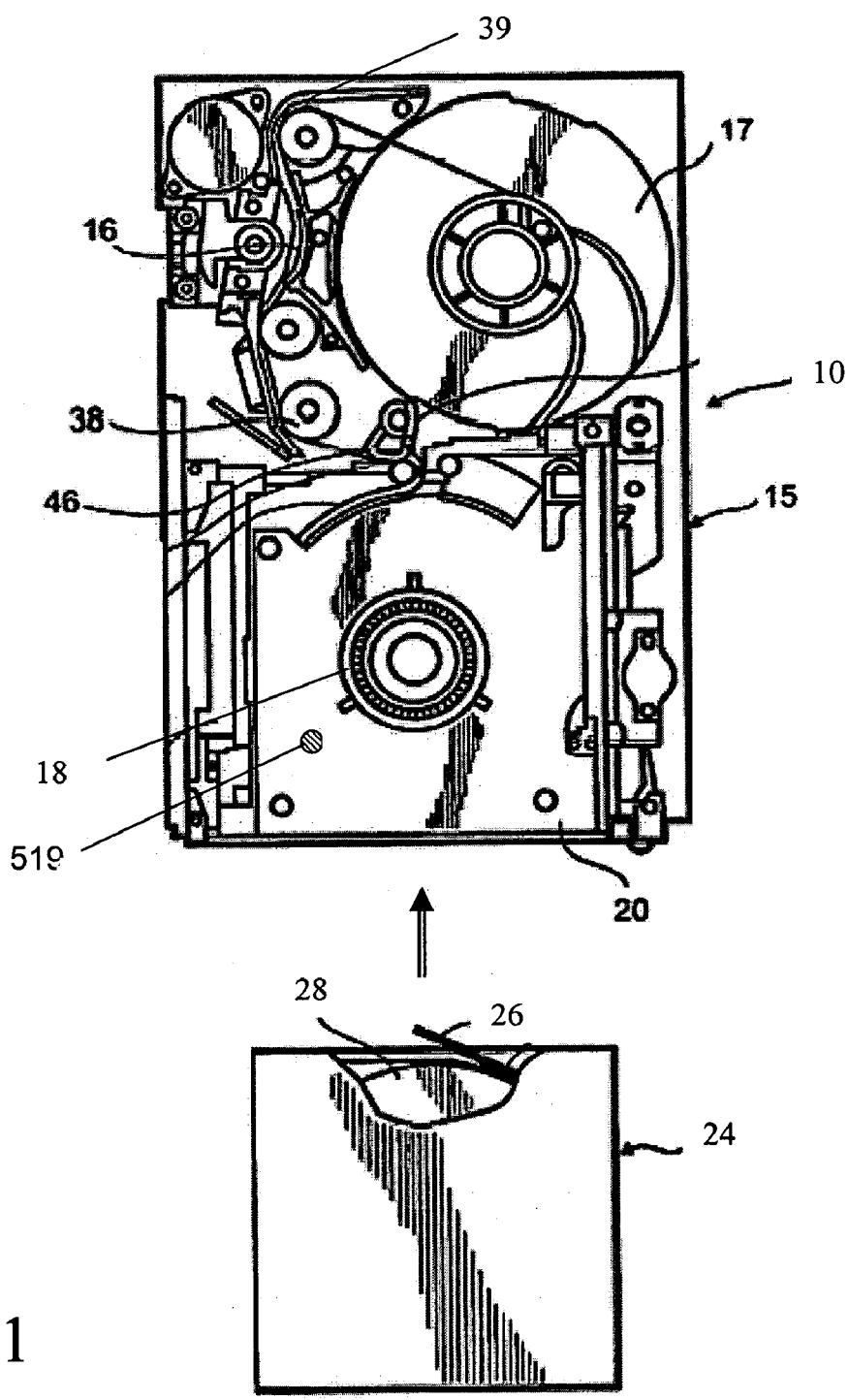
FIG. 1 illustrates a plan view of an exemplary magnetic tape drive and magnetic tape cartridge.

The following description is presented to enable a person of ordinary skill in the art to make and use the various aspects and examples of the inventions. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limiting to the examples described and shown, but is to be accorded the scope consistent with the appended claims.

It is commonly known in the storage media cartridge industry that tape edge damage can occur from excessive shock to the cartridge reel. For example, a single reel cartridge is somewhat freely mounted inside a cartridge housing, the reel having the freedom to rotate and translate axially (i.e., along the axis of rotation of the reel). The freedom of motion within the cartridge housing allows, among other things, the reel to accommodate for varying drive tolerances and the like. Often, a simple spring (e.g., a hub spring) is included to bias the reel towards an opening in the cartridge housing and is the only holding force used to captivate the reel internally within the cartridge housing. The spring (or other method of biasing the reel) is generally adapted to provide a secure engagement with a reel driver or other external driving apparatus. The spring is generally weak and may be overcome if the cartridge is sufficiently jostled or dropped such that the reel or relatively weak reel flanges contact internal components of the cartridge. For example, during a collision the reel may move within the cartridge housing and contact internal portions of the cartridge housing. During such a collision, the reel flanges may deflect and make contact with the tape pack causing damage to the edge of tape, especially those edges that extend out form the tape pack (e.g., staggered wraps).

In one example described herein, an integrated locking mechanism is provided with a media cartridge to secure or restrict motion of the reel within the cartridge housing. The locking mechanism may be selectively locked and unlocked, e.g., securing and unsecuring the reel within the cartridge housing. This allows, for example, the reel to be secured between uses. In one example, the locking mechanism presses and secures the reel against internal structure(s) of the cartridge housing to restrict movement of the reel within the cartridge housing. Restricting movement of the reel within the cartridge housing may reduce the potential for reel and/or tape damage if the cartridge experiences a shock or sudden movement. Further, in one example the locking mechanism is integral with the cartridge, e.g., the locking mechanism is not removed or detached from the cartridge when the reel is unlocked.

In one example, the locking mechanism includes a cam actuator, e.g., a disc or cylindrical member disposed adjacent the reel, which translates axially with rotation. In one example, the cam actuator includes one or more slots that engage corresponding ramps or guiding members included with the cartridge base, e.g., molded into the cartridge base. The cam actuator and the reel may be aligned coaxially such that rotation of the cam actuator, causing the cam actuator to engage the ramps or guiding members and translate axially, translates the reel along its axis of rotation. The cam actuator may be appropriately configured to press and lock the reel against a portion of the cartridge housing, e.g., against the top of the cartridge housing or other structure of the cartridge housing. Further, in one example, the cam actuator is activated by finger actuators, accessible from an exterior of the cartridge housing.

Referring initially to FIG. 1, an exemplary tape drive 10 is illustrated that may be used with an exemplary cartridge 24 including an integrated hub locking device to reduce the potential for media and/or cartridge damage. Tape drive 10 includes a tape drive housing 15, a data transducer, i.e., read and/or write head 16, a take-up reel 17, and a receiver 20. Tape drive 10 is used in conjunction with a cartridge 24 which houses a storage tape 26 on supply reel 28. Receiver slot 20 is configured to receive a suitable cartridge 24 therein adjacent reel driver 18. Receiver slot may also include a pin 519 or other element to engage cartridge 24 to unlock a locking mechanism associated with drive 10, for example (as will be described in greater detail with respect to FIG. 5). Tape drive 10 may also include a door and various mechanisms for receiving and ejecting cartridge 24. When cartridge 24 is received in receiver slot 20 a buckler motor 46 or the like may engage a cartridge leader and stream storage tape 26 along a tape path within tape drive 10 passing read/write head 16 and onto take-up reel 17. The tape path may include various tape guides 39, rollers 38, one or more read/write heads 16, and the like before being wound upon take-up reel 17. It should be understood that exemplary cartridges described herein may be used with various tape drives not explicitly shown or described. Additionally, various other features of a tape drive may be included, for example, various buckler systems, rollers, tape guides, receiving mechanisms, dampers, and the like may be used.

Tape drive 10 is typically installed within or associated with a computer (not shown) or computer network. Additionally, tape drive 10 may be used as part of an automated tape library having a plurality of tape cartridges and a robotic transfer mechanism to transport cartridges to one or more tape drives. An exemplary storage library is described in U.S. Pat. No. 5,760,995, entitled "MULTI-DRIVE, MULTI-MAGAZINE MASS STORAGE AND RETRIEVAL UNIT FOR TAPE CARTRIDGES," which is hereby incorporated by reference in its entirety.

Cartridge 24 generally includes a substantially rectangular cartridge housing which encloses cartridge reel 28 and storage tape 26. Cartridge 24 may further include a cartridge door to protect storage tape 26 therein and a cartridge leader (not shown), which is exposed when the door is open. Storage tape 26 stores information in a form, e.g., digital, that may be subsequently retrieved if desired. Storage tape 26 may be approximately one-half inch in width, but larger and smaller widths are contemplated, e.g., 4-8 mm. Storage tape 26 may have a thickness of approximately 0.5 mils (0.0005 inch) or thinner. Typically, storage tape 26 includes a storage surface on one side of storage tape 26 that may be divided into a plurality of parallel tracks along the length of storage tape 26. Alternatively, the data may be recorded in diagonal strips across storage tape 26.

Figure 2:
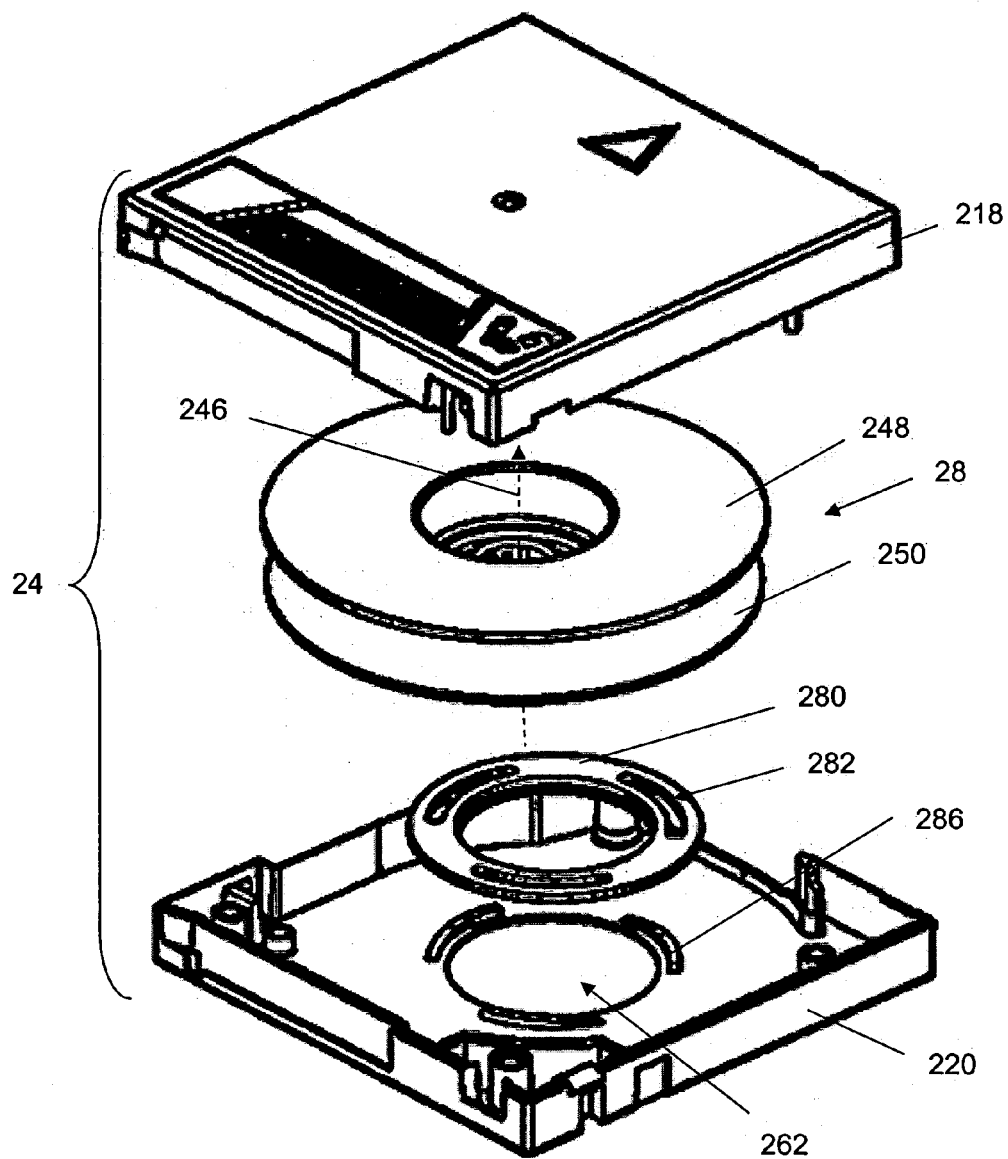
FIG. 2 illustrates an exploded view of an exemplary media cartridge including an integrated reel locking mechanism.
Figure 3:
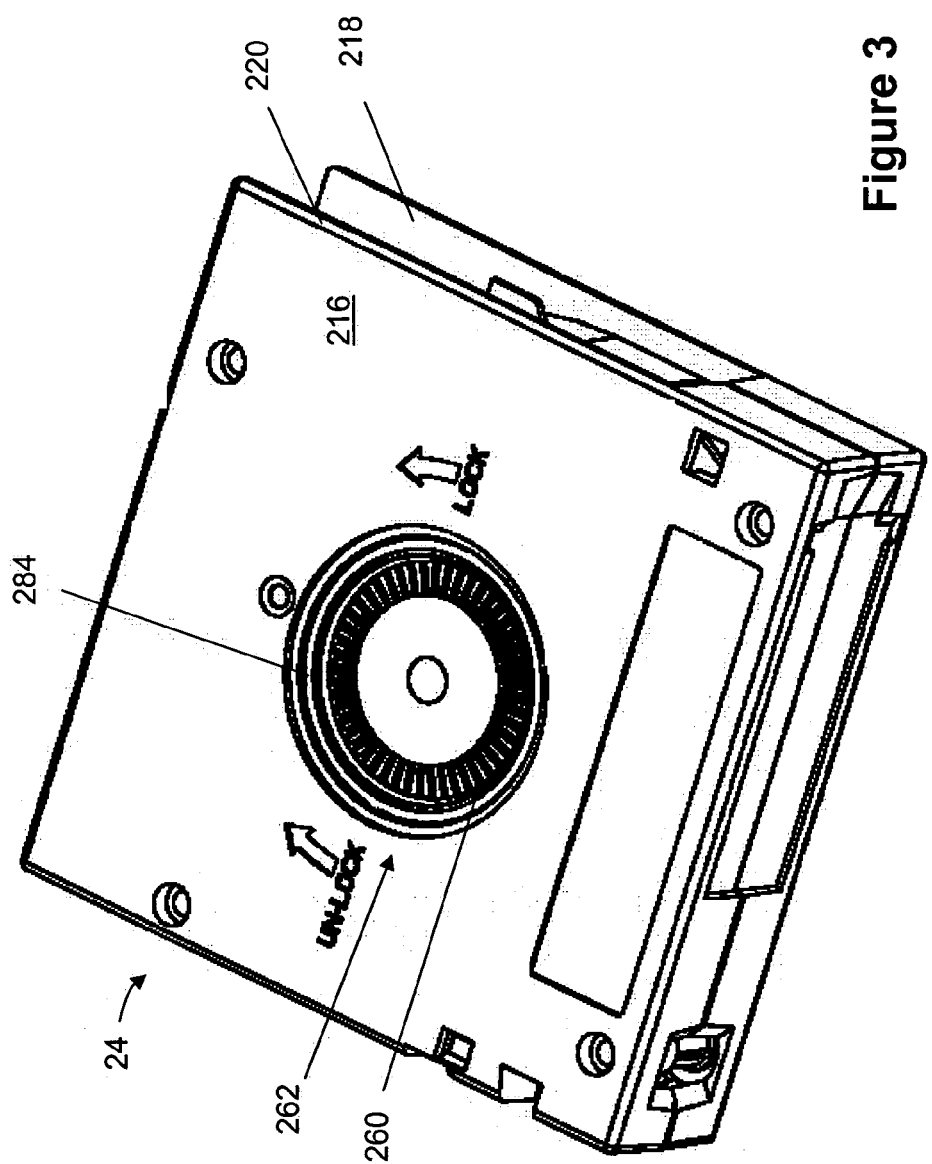
FIG. 3 illustrates a perspective view of an exemplary media cartridge including an integrated reel locking mechanism.
Figure 4:
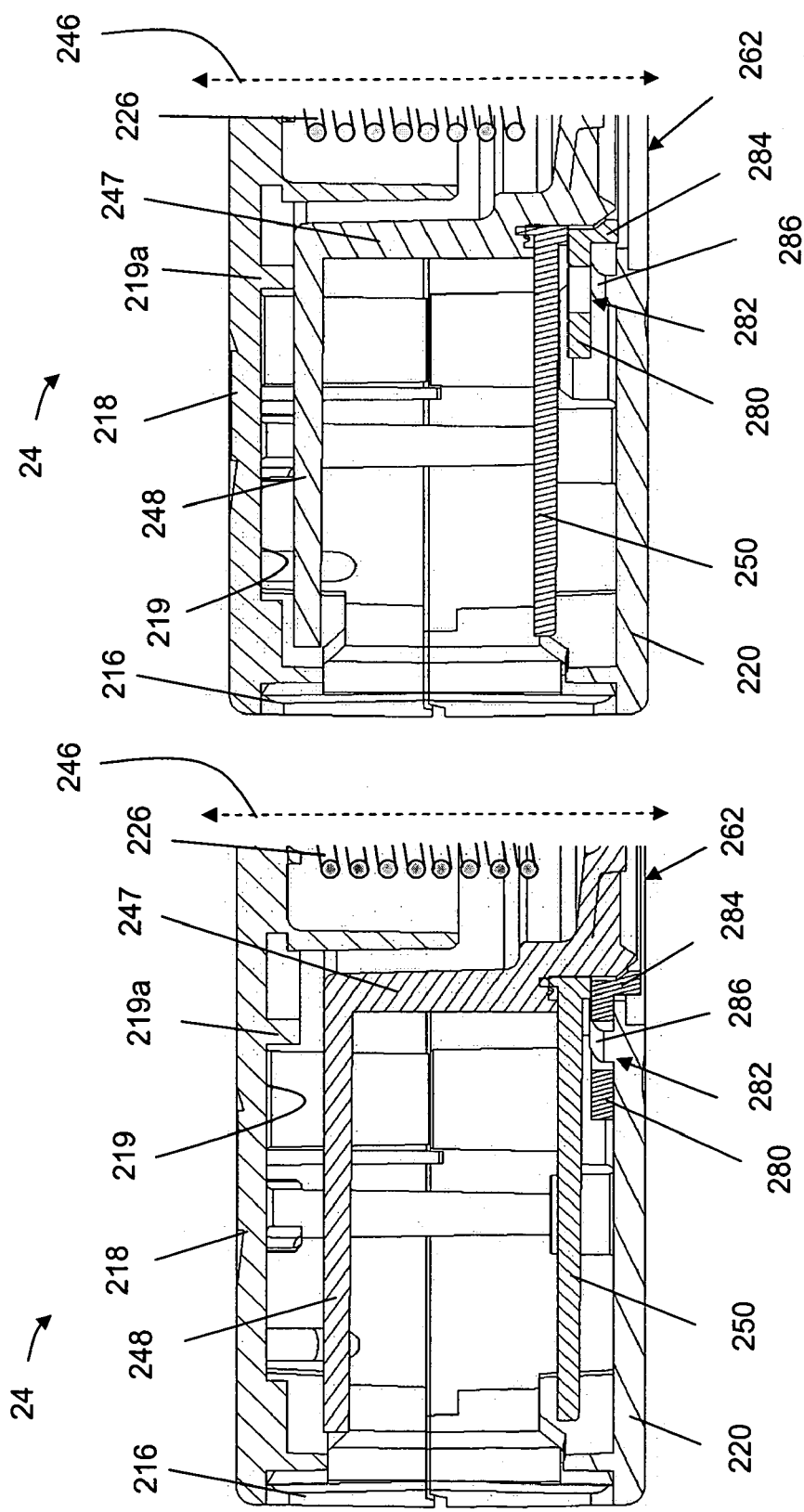
FIGS. 4A and 4B illustrate partial cross-sectional side-views of an exemplary media cartridge having an integrated locking mechanism in an unlocked and locked position respectively.

FIGS. 2, 3, 4A, and 4B illustrate various views of an exemplary cartridge 24, and are advantageously referenced in combination. In particular, FIG. 2 illustrates an exploded view of cartridge 24, FIG. 3 illustrates a perspective view of an assembled cartridge 24, and FIGS. 4A and 4B illustrate partial cross-sectional side views of cartridge 24 in an unlocked and locked position respectively.

Cartridge 24 is shown including a generally rectangular housing 216, which rotatably secures and protects reel 28 and storage tape (not shown) wound thereon from damage and contaminants. The design of cartridge housing 216 can vary depending upon the design requirements of cartridge 24 and reel 28. Cartridge housing 216 may be made of any suitable material, for example plastic and the like. The cartridge housing preferably includes a rigid material to protect the enclosed reel 28 and magnetic tape. Suitable materials include metal, plastic, rubber, ceramics, and composites thereof. A particular example of a plastic commonly used for forming cartridge housings 216 is polycarbonate. Further, the cartridge housing may be manufactured by injection molding processes as are known in the art. Further, reel 28 may include any suitable material such as plastics, low friction metals, ceramics, and the like.

Cartridge housing 216 may be of any shape or dimension which permits reel 28 to be contained therein, and which allows cartridge 216 to appropriately fit into a corresponding tape drive. In this example, cartridge housing 216 is illustrated as generally box-shaped and contains reel 28; however, other shapes, including disc-shaped, elliptical, square, and triangular cartridge housings 216, which may contain one or more reels 28, are contemplated.

In this example, cartridge housing 216 includes an upper housing section 218 that includes an upper interior surface 219, a lower housing section 220, and a reel 28 adapted to have magnetic storage tape wound thereon (not shown). Reel 28 rotates about a rotational axis 246 during winding or unwinding of storage tape. The design of reel 28 can be varied to suit the design requirements of the particular cartridge 24. In this example, reel 28 includes a hub 247, an upper flange 248, and a lower flange 250. A plurality of teeth 260 are included with hub 247 and exposed through an opening 262 of housing 216.

As shown in FIGS. 4A and 4B, a biasing member 226 (often referred to as a "hub spring") is included to bias reel 28 within housing 216 toward the lower housing section 220, and in particular opening 262. Opening 262 allows for the engagement of an external mechanism (e.g., reel driver 18 illustrated in FIG. 1) to cause rotation of reel 28. In this example, one end of the spring rests against the upper housing section 218 of cartridge housing 216. The opposite end of the spring can be set against reel 28. Any sufficiently resilient material can be used for biasing member 226. Biasing member 226 allows reel 28 to move axially within housing 216 to accommodate varying running heights of reel drivers in different drives. Biasing member 226 also supplies a biasing force to reel 28 against a reel driver of a tape drive to ensure proper engagement of teeth 262 and opposing teeth or members of a reel driver. Additionally, biasing member 226 may bias reel 28 such that the lower flange 250 is substantially parallel to the lower interior surface of the lower housing section 220.

Generally, it is not uncommon for cartridge 24 to experience a shock or jolt during handling (e.g., from being dropped or experiencing other collisions), which may cause reel 28 to move relative to housing 216 and collide with internal structure of housing 216. For example, if cartridge 24 is dropped on the upper housing section 218, reel 28 (including flange 248) may tip or translate axially (along rotational axis 246) and collide with portions of the upper interior surface 219. Conventional hub springs, used primarily for biasing reel 28 toward an opening in housing 216, typically have low spring constant ("k") values and may not prevent reel 28 from moving within cartridge housing 216, e.g., translating axially, tilting, or the like. Movement of reel 28 within housing 216 may allow for contact between portions of reel 28 and upper interior surface 219 (or other structures within cartridge housing 216). Such contact may cause damage to reel 28 and tape wound thereon.

In one example, reel 28 is selectively secured relative to housing 216 by an integral locking mechanism to reduce the potential for damage to reel 28. In this example, the locking mechanism generally includes cam actuator 280. Cam actuator 280 is included within housing 216 and is adapted to selectively restrict movement of reel 28, and in this particular example, selectively restrict the freedom of reel 28 to move axially. In this example, cam actuator 280 is rotated, e.g., by a user, and translates axially within housing 216, thereby restricting or eliminating the freedom of reel 28 to translate axially within housing 216. Cam actuator 280 includes a cylindrical element having slots 282 formed therein, which correspond to ramps 286 formed in lower housing portion 220. In a first position, cam actuator 280 has a low profile and is adjacent lower housing portion 220 with ramps 286 aligned with slots 282. In other examples, lower housing portion 220 may include a recess containing cam actuator 280 and ramps 286. In a second position, with cam actuator 280 rotated appropriately, cam actuator 280 is raised by ramps 286 and moves axially away from lower housing section 220 toward upper housing portion 218. As cam actuator 280 moves axially toward upper housing portion 218, the freedom of reel 28 to move within cartridge housing 216 is restricted, e.g., reel 28 is restricted from moving axially as cam actuator 280 moves up.

With cam actuator 280 in a first position, e.g., an unlocked position, as shown in detail in FIG. 4A, reel 28 may move axially (as well as radially and rotationally) within cartridge housing 216. For example, biasing member 226 is engaged with reel 28, thereby biasing reel 28 towards the opening 262 of cartridge housing 216 and against external drive mechanisms. Reel 28 may move axially within a desired range while engaging biasing member 226 to accommodate varying drive tolerances and running heights. Further, reel 28 is free to rotate within cartridge housing 216. Accordingly, cartridge 24 operates similarly to a conventional media cartridge with cam actuator 280 in an unlocked position.

With cam actuator 280 in a second position, e.g., a locked position, as shown in detail in FIG. 4B, reel 28 is secured with respect to cartridge housing 216. Cam actuator 280 is selectively rotated to secure reel 28 against upper interior housing 219 (or at least a portion thereof, such as a protrusion 219a of cartridge housing 216), as illustrated in FIG. 4B. For example, if reel 28 is sufficiently displaced toward top surface 218 by cam actuator 280, a portion of reel 28 (or at least a portion fixed with respect to reel 28) engages a portion of the cartridge housing 216 (or at least a portion fixed with respect to the cartridge housing 216). Thus, cam actuator 280 selectively allows relative motion of reel 28 to cartridge housing 216 in a first position and restricts motion of reel 28 relative to cartridge housing 216 in a second position. In this example, reel 28 is secured and restricted from rotational or radial motion as well. Restricting the motion of reel 28 by securing reel 28 against a portion of cartridge housing 216 may reduce damage to reel 28 and/or tape wound thereon.

In one example, protrusion 219a may be a compliant feature, for example, a spring or elastomeric material. A compliant feature may accommodate the stack-up of tolerances associated with holding the reel stationary within cartridge housing 216 and may also provide shock absorbency properties to the cartridge. Protrusion 219a could be molded as a living spring, separate elastomeric material, or the like. In another example, cam actuator 280 may include one or more compliant features associated therewith.

It will be recognized by those of ordinary skill in the art that various modifications may be made to the integrally formed locking mechanism described herein. The locking mechanism, including a cam actuator in one example, may have various other designs and include additional or different mechanisms for selectively securing or restricting a reel within a cartridge housing.

In one example, cam actuator 280 is coaxially aligned with reel 28 and is positioned to engage the hub portion 247 of reel 28. Contacting reel 28 near or at hub portion 247 of reel 28 reduces the potential for damaging, e.g., deflecting, one or more flanges 248, 250 of reel 28 when cam actuator 280 is used. For example, as shown most clearly in FIG. 4B, cam actuator 280 contacts lower flange 250 just below hub portion 247. Thus, although lower flange 250 is being contacted, use of cam actuator 280 is unlikely to deflect lower flange 250. Further, upper flange 248 engages protruding member 219a near hub 247 to reduce the potential for deflection of upper flange 248 when secured. In other examples, one or more of hub 247, lower flange 250, and upper flange 248 may contact portions of (or fixed with respect to) cartridge housing 216 in various other suitable positions. Further, cam actuator 280 may contact various portions of hub 247 and lower flange 250 in various other suitable positions.

In one example, cam actuator 280 is accessible from the exterior of housing 216, for example, through opening 262 (as seen in FIGS. 3, 4A, and 4B). In one example, finger actuators 284 are accessible through opening 262, whereby a user may selectively rotate cam actuator 280 to a locked or unlocked position as described.

In other examples, a media drive or library mechanism may be configured to rotate cam actuator 280 to a locked position after use and unlocked position prior to use. For example, a media drive may be adapted to lock a media cartridge (e.g., secure or restrict the movement of reel 28 within cartridge housing 216) prior to ejecting cartridge 24 and unlock cartridge 24 upon insertion and before unwinding the tape.

Figure 5:
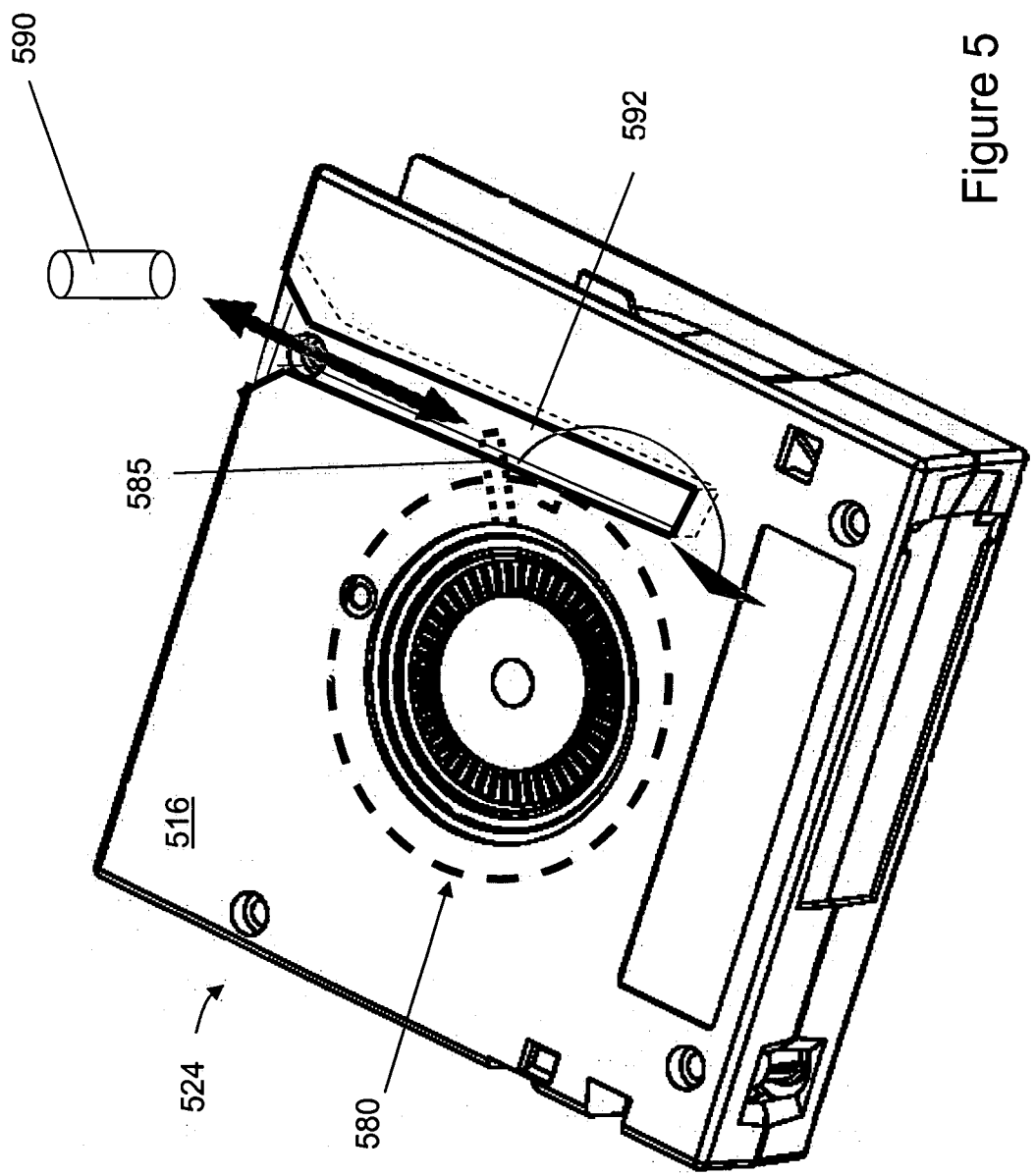
FIG. 5 illustrates an exemplary cartridge configured to interact with a media drive for locking and/or unlocking a locking mechanism associated with the cartridge.

FIG. 5 illustrates an exemplary cartridge 524 configured to interact with a media drive (e.g., as shown in FIG. 1) adapted to interact with a locking mechanism associated with cartridge 524. In one example, the locking mechanism 580 (shown in outline) of cartridge 524, which may include a cam actuator as previously described, is unlocked as the cartridge is inserted into the drive. For example, an element such as pin 590 associated with a drive may interact with cartridge 524 to unlock the locking mechanism 580 of cartridge 524. Pin 590 may be included within the receiver of a media drive (see, e.g., FIG. 1). In one example, cartridge 524 may include slot 592 to guide pin 590 to a lever 585 associated with the locking mechanism. Thus, upon insertion of cartridge 524 within a drive receiver the cartridge is unlocked and the reel therein may freely rotate. In one example, lever 585 may be included within cartridge housing 516 and accessible within slot 592 as shown. In other examples, lever 592 may be accessible from an exterior of cartridge housing 516.

In one example, the locking mechanism 580 of cartridge 524 is biased in a locked position such that when cartridge 524 is ejected from the drive, the reel is again locked. For example, a spring or other biasing element may be included with a rotating cam (or other locking mechanism) such that the cam is biased in a locked position when not within a drive, thereby restricting movement of the reel. The locking mechanism may be unlocked when inserted into the drive. It will be recognized by those of ordinary skill in the art that various other exemplary devices and methods may be employed by a media drive or library to selectively lock and unlock a cartridge, including passive or active elements.

FIGS. 6A and 6B illustrate cross-sectional side-views of another exemplary media cartridge having an integrated locking mechanism in an unlocked and locked position respectively. Cartridge 624 is similar to cartridge 24 shown in FIGS. 2, 3, 4A, and 4B and described herein; accordingly, only differences will be discussed in detail. In this example, cam actuator 680 is disposed between reel 28 an upper housing portion 218. As shown in FIG. 5A, with cam actuator 680 in a first position reel 28 is free to translate axially between lower housing portion 220 and upper housing portion 218. As described, reel 28 may be biased toward lower housing portion 218 and opening 262 therein.

Rotation of cam actuator 680 to a second position, as shown in FIG. 5B, secures reel 28 against lower housing portion 220 (or at least a portion associated with lower housing portion 220). In this example, cam actuator is translated during rotation similarly as described above by elements 686. Further, upper housing portion 219 may include an opening to access cam actuator 680 or a portion associated therewith to cause rotation of cam actuator 680.

FIGS. 7A and 7B illustrate cross-sectional side-views and top views of another exemplary media cartridge having an integrated locking mechanism in an unlocked and locked position respectively. Cartridge 724 is similar to cartridge 24 shown in FIGS. 2, 3, 4A, and 4B and described herein; accordingly, only differences will be discussed in detail. In this example, cartridge 724 has a locking mechanism 780 that interacts with elements 770 (e.g., tabs or the like) associated with reel 28 to secure reel 28. In particular, FIG. 7A illustrates cartridge 724 in a first, unlocked position, where locking mechanism 780 allows reel 28 to move within cartridge housing 216 similar to a conventional cartridge. FIG. 7B illustrates cartridge 724 in a second, locked position, where slots 782 associated with locking mechanism 780 are aligned with and engage tabs 770 associated with reel 28. Locking mechanism 780 is attached to cartridge housing 218 and therefore reduces or prevents movement of reel 28 within cartridge housing 216 when in the locked position.

In this example, locking mechanism 780 may lock reel 28 within cartridge housing 216 between the upper portion 218 and lower portion 220, e.g., without pressing reel 28 against the cartridge housing. In other examples, locking mechanism 780 may press reel 28 up or down when rotated to press reel 28 against a structure associated with cartridge housing 216. Additionally, in this example, locking mechanism 780 is rotated to secure reel 28, however, it will be apparent to those of ordinary skill in the art that a push-button locking mechanism similar to locking mechanism 780 or 280 could be fashioned to lock reel 28 within cartridge housing 216.

The above detailed description is provided to illustrate various examples and is not intended to be limiting. It will be apparent to those of ordinary skill in the art that numerous modification and variations within the scope of the present invention are possible. For example, various examples described herein may be combined and altered. Further, numerous other devices and processes not explicitly described herein may be used with the exemplary cartridges and locking mechanisms described as will be recognized by those of ordinary skill in the art. Additionally, within the description, particular examples have been discussed and how these examples are thought to address certain disadvantages in related art. This discussion is not meant, however, to restrict the various examples to methods and/or systems that actually address or solve the disadvantages. Accordingly, the present invention is defined by the appended claims and should not be limited by the description herein.

The invention claimed is:

1. A data storage cartridge, comprising:
    a cartridge housing;
    a reel disposed between an upper and a lower portion of the cartridge housing, the reel capable of movement within the cartridge housing; and
    a locking mechanism, wherein the locking mechanism comprises a cam which translates axially within the cartridge housing when the cam is rotated, thereby selectively restricting axial movement of the reel between the upper and lower portion of the cartridge housing.

2. The data storage cartridge of claim 1, wherein the locking mechanism is adapted to lock when removed from a drive.

3. The data storage cartridge of claim 1, wherein the reel is capable of translating axially between the upper and lower portion of the housing with the cam in a first position and is restricted from translating axially with the cam in a second position.

4. The data storage cartridge of claim 1, wherein the cam is integrated with the cartridge housing.

5. The data storage cartridge of claim 1, wherein the cam is coaxially aligned with a hub of the reel.

6. The data storage cartridge of claim 1, wherein the cam is accessible from an exterior of the cartridge housing.

7. The data storage cartridge of claim 1, wherein rotation of the cam biases the reel against a portion of the housing.

8. The data storage cartridge of claim 1, wherein the reel is capable of movement within the cartridge housing with the locking mechanism in a first position and is restricted from movement within the cartridge housing with the locking mechanism in a second position.

9. The data storage cartridge of claim 1, wherein the reel is held against at least one protrusion associated with the cartridge housing when movement is restricted by the locking mechanism.

10. The data storage cartridge of claim 9, wherein the at least one protrusion includes a compliant material.

11. The data storage cartridge of claim 1, wherein the locking mechanism is accessible from an exterior of the cartridge housing.

12. The data storage cartridge of claim 1, wherein the locking mechanism is biased to restrict movement of the reel.

13. The data storage cartridge of claim 1, wherein the locking mechanism is adapted to unlock when inserted into a drive.

14. A data storage cartridge, comprising:
    a housing;
    a reel rotatably disposed within the housing between an upper and a lower portion; and
    a cam operable to translate axially within the cartridge housing when the cam is rotated, thereby restricting motion of the reel within the housing by pressing the reel against a portion of the housing.

15. The data storage cartridge of claim 14, wherein the reel is capable of translating axially between the upper and lower portion of the housing with the cam in a first position and is restricted from translating axially with the cam in a second position.

16. The data storage cartridge of claim 14, wherein the cam is integrated with the cartridge housing.

17. The data storage cartridge of claim 14, wherein the cam is coaxially aligned with a hub of the reel.

18. The data storage cartridge of claim 14, wherein the cam is accessible from an exterior of the cartridge housing.

19. The data storage cartridge of claim 14, wherein the locking mechanism is adapted to unlock when inserted into a drive.

20. The data storage cartridge of claim 14, wherein the cam is adapted to restrict motion of the reel when removed from a drive.

21. A method for manufacturing a data storage cartridge, comprising,
    rotatably mounting a reel within a cartridge housing; and
    disposing a locking mechanism with the cartridge housing, the locking mechanism comprising a cam which translates axially within the cartridge housing when the cam is rotated, the locking mechanism adapted to selectively restrict movement of the reel within the cartridge housing.

22. The method of claim 19, wherein the locking mechanism comprises a cam secured to a portion of the cartridge housing and adapted to engage and secure the reel when the cam is rotated.

23. The method of claim 22, wherein the cam is integrated with the cartridge housing.

24. The method of claim 22, further comprising coaxially aligning the cam with a hub of the reel.

25. The method of claim 22, wherein the cam is accessible from an exterior of the cartridge housing.

26. The method of claim 22, wherein rotation of the cam biases the reel against a portion of the cartridge housing.

27. The method of claim 22, further comprising disposing a compliant material within the cartridge housing, the compliant material contacting the reel when the reel is selectively restricted.

28. The method of claim 21, wherein the locking mechanism is adapted to engage and secure the reel with the cartridge housing.

29. The method of claim 19, further including integrating the locking mechanism with the cartridge housing.

30. The method of claim 21, wherein the locking mechanism is adapted to unlock when inserted into a drive.

31. The method of claim 21, wherein the locking mechanism is adapted to lock when removed from a drive.

* * * * *